(12) United States Patent
Müller et al.

(10) Patent No.: US 10,273,737 B2
(45) Date of Patent: Apr. 30, 2019

(54) DRIVE ARRANGEMENT AND HATCH CONTROL

(71) Applicant: Stabilus GmbH, Koblenz (DE)

(72) Inventors: Thomas Müller, Leuterod (DE); Jörg Hillen, Nörtershausen (DE); Mathias Wieland, Koblenz (DE)

(73) Assignee: Stabilus GmbH, Koblenz (DE)

( * ) Notice: Subject to any disclaimer, the term of this patent is extended or adjusted under 35 U.S.C. 154(b) by 120 days.

(21) Appl. No.: 15/323,133

(22) PCT Filed: Jun. 29, 2015

(86) PCT No.: PCT/EP2015/064710
§ 371 (c)(1),
(2) Date: Dec. 30, 2016

(87) PCT Pub. No.: WO2016/001147
PCT Pub. Date: Jan. 7, 2016

(65) Prior Publication Data
US 2017/0138107 A1     May 18, 2017

(30) Foreign Application Priority Data

Jul. 2, 2014   (DE) .......................... 10 2014 212 863

(51) Int. Cl.
*E05F 15/611*     (2015.01)
*F16H 25/24*      (2006.01)
(Continued)

(52) U.S. Cl.
CPC ........ *E05F 15/611* (2015.01); *F16H 25/2454* (2013.01); *B60J 5/047* (2013.01);
(Continued)

(58) Field of Classification Search
None
See application file for complete search history.

(56) References Cited

U.S. PATENT DOCUMENTS

| 5,036,939 A | * | 8/1991 | Johnson | ............. B60K 17/3515 |
| | | | | 180/233 |
| 5,429,218 A | * | 7/1995 | Itoh | ........................ B60K 17/26 |
| | | | | 188/134 |

(Continued)

FOREIGN PATENT DOCUMENTS

| DE | 102009029167 | 6/2010 |
| DE | 202011106110 | 1/2013 |

(Continued)

OTHER PUBLICATIONS

International Search Report of PCT/EP2015/064710 dated Oct. 7, 2015, 6 pages (English and German).

(Continued)

*Primary Examiner* — Catherine A Kelly
(74) *Attorney, Agent, or Firm* — Rankin, Hill & Clark LLP

(57) ABSTRACT

The present invention relates to a drive arrangement, comprising a motor drive shaft, which makes the drive force of a motor available, an output shaft, via which the drive arrangement outputs and accumulates a rotational force, a coupling, which is designed to transmit a rotational force from the motor drive shaft to the output shaft and from the output shaft to the motor drive shaft, and a braking arrangement, which counteracts a rotational movement of the output shaft with a braking force.

13 Claims, 8 Drawing Sheets

(51) Int. Cl.
  *F16H 35/00* (2006.01)
  *F16D 125/38* (2012.01)
  *F16D 127/00* (2012.01)
  *F16D 127/06* (2012.01)
  *F16H 25/20* (2006.01)
  *B60J 5/04* (2006.01)

(52) U.S. Cl.
  CPC ..... *E05Y 2201/21* (2013.01); *E05Y 2201/266* (2013.01); *E05Y 2900/531* (2013.01); *F16D 2125/38* (2013.01); *F16D 2127/005* (2013.01); *F16D 2127/06* (2013.01); *F16H 2025/2075* (2013.01); *F16H 2035/005* (2013.01)

(56) References Cited

U.S. PATENT DOCUMENTS

| | | | | |
|---|---|---|---|---|
| 6,390,264 | B2* | 5/2002 | Torii | E05F 11/505 |
| | | | | 192/223.2 |
| 6,575,277 | B1* | 6/2003 | Torii | E05F 11/505 |
| | | | | 192/12 B |
| 7,347,115 | B2* | 3/2008 | Otaki | B60T 13/746 |
| | | | | 74/89.37 |
| 8,662,271 | B2* | 3/2014 | Iwano | F16D 41/105 |
| | | | | 192/44 |
| 9,097,056 | B2* | 8/2015 | Kummer | E05F 15/622 |
| 9,590,467 | B2* | 3/2017 | Heinze | F16D 41/105 |
| 9,746,040 | B2* | 8/2017 | Schoolcraft | F16D 41/088 |
| 9,970,499 | B2* | 5/2018 | Yamasaki | F16D 65/183 |
| 2005/0155444 | A1* | 7/2005 | Otaki | B60T 13/746 |
| | | | | 74/89 |
| 2013/0186717 | A1* | 7/2013 | Muramatsu | F16D 55/226 |
| | | | | 188/72.1 |
| 2015/0276031 | A1* | 10/2015 | Suzuki | F16H 25/2454 |
| | | | | 74/89.39 |

FOREIGN PATENT DOCUMENTS

| | | | | |
|---|---|---|---|---|
| DE | 202011106110 U1 * | 1/2013 | | F16D 41/105 |
| DE | 102012110505 | 5/2014 | | |
| EP | 1186800 | 3/2002 | | |
| WO | 2011037023 | 3/2011 | | |

OTHER PUBLICATIONS

Tooten K. H. et al.: "Stand Der Entwicklung Und Einsatzmoeglichkeiten Von Lastmomentsperren" Antriebstechnik, Krausskopf Verlag Fur Wirtschaft GmbH. Mainz, DE, vol. 32, No. 1, 1993, pp. 57-61, XP000338549 ISSN: 0722-8546.

Notification of Transmittal of Translation of the International Preliminary Report on Patentability (Chapter I or Chapter II) and International Preliminary Report on Patentability dated Jan. 12, 2017, 7 pages.

* cited by examiner

DRIVE ARRANGEMENT AND HATCH CONTROL

BACKGROUND

The present invention relates to a drive arrangement, comprising a motor drive shaft, which provides driving force of a motor, a working shaft, via which the drive arrangement delivers and receives operating torque, a coupling, which is set up to transmit torque from the motor drive shaft to the working shaft and from the working shaft to the motor drive shaft, and a brake arrangement which counters a rotational movement of the working shaft with a braking force. Furthermore, the invention relates to a flap control system that has a flap pivotally mounted about a pivot axis, a motor and a drive arrangement of the aforementioned kind.

In prior art, drive arrangements, in particular for the electromechanical driving of doors or flaps, are known, for example apparatuses for the electromechanical opening and closing of vehicle flaps. In the process, the force of the electric motor is transmitted by a coupling onto a working shaft bearing the flap. Depending on the field of application, situations also inevitably occur when using known apparatuses, in which a rotational movement is introduced into the drive arrangement by the working shaft. In particular, in the case of vertically moving flaps, operating torque is introduced into the drive shaft by the gravity of the flap. Furthermore, when using the drive arrangement by manual movement of the flap by the user, rotational movement can be introduced into the drive shaft.

In order to avoid an excessive load on the motor during torque transmission from the working shaft to the motor drive shaft or to prevent an unintentional adjustment of the flap (for example as a result of gravitational force) when the motor is switched off, known drive arrangements occasionally have brake arrangements, which counter the rotation of the shafts of the drive arrangement with a predetermined resistance. In the case of flaps moving in a vertical direction, the braking force of the brake arrangement is to be rated such that when the motor is idle, an autonomous downward movement of the flap is prevented such that the set pivot position of the flap is retained. In addition, brake arrangements are known, which fix a certain turning position between working shaft and motor drive shaft when the motor is idle in order to prevent a manual rotation of the motor by the user and therefore a potential overload of the motor.

In the case of drive arrangements with brake arrangements of the kind referred to above, the disadvantage emerges that the braking effect of the brake arrangement must be overcome by the motor when operating the drive arrangement in order to start the working shaft rotating. The use of a brake arrangement described above therefore works at the cost of energy efficiency when operating the drive arrangement.

Against the background of his problem, the object of the present invention is to provide a drive arrangement and a flap control system which have a high functional range and at the same time work with high energy efficiency.

BRIEF DESCRIPTION

According to a first aspect, the above object of the invention is achieved by a drive arrangement comprising a motor drive shaft, which provides driving force of a motor, a working shaft, via which the drive arrangement delivers and receives operating torque, a coupling, which is set up to transmit torque from the motor drive shaft to the working shaft and from the working shaft to the motor drive shaft, and a brake arrangement which counters a rotational movement of the working shaft with a braking force, the brake arrangement countering the rotational movement during the transmission of torque from the working shaft to the motor drive shaft with a first braking force and the brake arrangement countering the rotational movement during transmission of torque from the motor drive shaft to the working shaft with a second braking force which is smaller than the first braking force or substantially countering it with no braking force.

According to an important feature of the first aspect of the present invention, the braking force generated by a brake arrangement in the case of a transmission of torque from the working shaft to the motor drive shaft is greater than in the case of a transmission of torque from the motor drive shaft to the working shaft, the brake arrangement preferably not substantially releasing any braking force at all in the latter case. Depending on the direction of the torque transmission (from the working shaft to the motor drive shaft or in the opposite direction), the brake arrangement therefore changes its braking force and its braking effect. As a result, the brake arrangement acts with the required force when torque is introduced at the working shaft, for example due to the gravitational force of a flap attached to the working shaft or due to the introduction of a rotational movement by a user, while in the case of power transmission emanating from the motor, the brake arrangement is switched into a reduced braking mode or a mode with released brake such that the motor only has to overcome a reduced braking force or preferably substantially no braking force at all when driving the working shaft. Consequently, the motor power can be used more efficiently and the energy efficiency of the drive arrangement can be increased.

In a preferred embodiment of the invention, the coupling is set up to transmit operating torque in both directions of rotation, i.e. when transmitting operating torque from the motor drive shaft to the working shaft, the working shaft can be rotated in both directions by motor force and/or the drive arrangement is set up to receive a rotational movement from the working shaft in both directions of rotation and either slow it down or allow it. In this manner, the functional scope of the drive arrangement is increased. In the case of transmission of operating torque from the working shaft to the motor drive shaft, in one variant of the invention, the brake arrangement can generate a first braking force in a second direction of rotation which counters the rotational movement, the brake arrangement generating a third braking force countering the rotational movement, which braking force is smaller than the first braking force or substantially countering with no braking force, during transmission of the operating torque from the working shaft to the motor drive shaft in a first direction of rotation opposing the second direction of rotation. During transmission of operating torque from the working shaft to the motor drive shaft, the brake arrangement can therefore work depending on the direction of rotation such that it generates the first braking force in one direction of rotation and a smaller, third braking force or no braking force at all in the other direction of rotation. This variant of a drive arrangement is, for example, of particular advantage if the working shaft is connected to a flap that is movable in a vertical direction and the brake arrangement applies the first (higher) braking force during a downwards movement of the flap in order to hold the flap in the adjusted position even if the motor is idle, and simultaneously to allow a manual upwards movement of the flap by the user.

In a further preferred embodiment of the invention, it is provided for the coupling to have a first coupling component, which is arranged or constructed on one element out of the working shaft and motor drive shaft and that the coupling has a second coupling component, which is arranged or constructed on the other element out of the working shaft and motor drive shaft, both coupling components being coupled together or it being possible to couple both coupling components together to transmit operating torque. In the process, the first coupling component can have a first stop which hits against a second stop of the second coupling component in the circumferential direction in relation to the axis of rotation in order to carry the second stop along in rotation in a first direction of rotation and to transmit operating torque onto the second coupling component in the first direction of rotation. Such rotation stops allow an interlocking coupling between coupling components and therefore the rotational movement is reliably carried along in a relatively simple mechanical arrangement.

Furthermore, when using a coupling having rotation stops of the kind referred to above, it is preferable for the first coupling component to have a third stop, which hits against a fourth stop of the second coupling component in the circumferential direction in relation to the axis of rotation in order to carry the fourth stop along in rotation in a second direction of rotation opposite to the first direction of rotation and to transmit operating torque onto the second coupling component in the second direction of rotation, the first stop being arranged at a distance from the second stop when the third stop hits against the fourth stop, such that there is a predetermined idling angle between the coupling components. The provision of the idling angle can advantageously be used to detect in which direction the operating torque is being transmitted, i.e. from the working shaft to the motor drive shaft or from the motor drive shaft to the working shaft. To be more precise, by providing the idling angle, an angle range can be created in which the two coupling components can rotate towards one another without carrying one another along immediately such that a changeover device arranged within the idling angle can detect whether the rotary drive is emanating from the first coupling component or from the second coupling component, i.e. whether the operating torque is being introduced from the motor drive shaft or from the working drive. One part of the brake arrangement is therefore preferably active in the form of said changeover device when the two coupling components are rotating relative to one another within the idling angle.

The brake arrangement preferably comprises a brake block moved together with the working shaft or the motor drive shaft (if applicable, with the respective assigned coupling component), which in the event of braking is pressed against a brake surface fixed relative to the working shaft and to the motor drive shaft. This allows a frictional braking effect and therefore a certain damping of the braking process to protect material and reduce sound. In the process, the brake block can be a rolling element, in order to reduce the wear on the brake arrangement. The brake block can surround the axis of rotation in an annular manner, as a result of which a simple integration of the brake arrangement emerges.

A reliable and, at the same time, in mechanical terms relatively simple brake arrangement and coupling can be achieved if the brake block rolls or slides on a control surface of the first coupling component along a direction of the control surface, the direction of the control surface being orientated orthogonally to the axis of rotation and at an angle to the radial direction, preferably at least in portions orthogonally to the radial direction, and/or the control surface being formed by a local recess or flattening on a cylindrical outer circumference of the first coupling component. In this and also in other variants using a brake block, it is advantageous to use a plurality of brake blocks, which are advantageously distributed at even angular distances from one another about the axis of rotation. In this manner, a balanced mechanical load of the brake arrangement in the event of braking emerges and a load on the axes of rotation in directions transverse to the axis of rotation is largely avoided.

A brake block of a brake arrangement can be controlled with directional dependency to achieve the present invention in a particularly simple manner in that when operating torque is transmitted from the working shaft to the motor drive shaft in a predetermined direction of rotation, the brake block is pressed by the first coupling component against the brake surface and when operating torque is transmitted from the motor drive shaft to the working shaft in the predetermined direction of rotation, the brake block is moved by the second coupling component in a direction to release the engagement with the brake surface. Depending on from which component the operating torque is being introduced (from the working shaft or from the motor drive shaft), the respective coupling component assigned to this element then moves the brake block either towards the brake surface or away from the brake surface. Depending on the direction of power flow, the rotation is therefore braked by applying the brake block to the brake surface (when operating torque is introduced into the working shaft) or the brake block is pressed away from the brake surface and the braking effect is cancelled (when the operating torque is introduced via the motor drive shaft).

According to a second aspect of the present invention, the object of the invention referred to above is achieved by a flap control system comprising a flap pivotally mounted about a pivot axis, a motor and a drive arrangement according to the first aspect of the present invention, the motor axle providing the driving power of the motor and the working axle moving the pivot axle in order to actuate the flap in an opening direction and a closing direction. Using a flap control system of the second aspect of the invention, the advantages and functions described above in connection with the first aspect of the invention can be exploited for controlling the movement of a flap, for example in automotive construction in the case of a tailgate of a vehicle. Alternatively, the flap control system can be used to pivot doors or other components which are to be pivoted electromagnetically about a predetermined angle range.

In order to allow a compact arrangement, the pivot axis is preferably arranged coaxially to the working axle or is formed by the working axle. The flap control system can then in particular also be integrated into a hinge arrangement of the flap so as to be visually inconspicuous and so as to save installation space and therefore has advantages in particular over a known triangular configuration with a telescopic cylinder between flap and frame.

The advantages of the present invention, in particular the directionally dependent brake arrangement, come into effect in particular when the flap is lowered in the closing direction and the brake arrangement counters a movement of the flap in the closing direction with a first (higher) braking force. The first braking force can then be used to hold the flap when the motor is idle, while a lower or no braking force acts during a motor-operated upwards movement of the flap such that the motor can apply its power in an effective manner to overcome the gravity of the flap.

BRIEF DESCRIPTION OF THE DRAWINGS

The invention is described in more detail below with reference to preferred embodiments and the accompanying drawings, in which.

DETAILED DESCRIPTION

Figure 1:
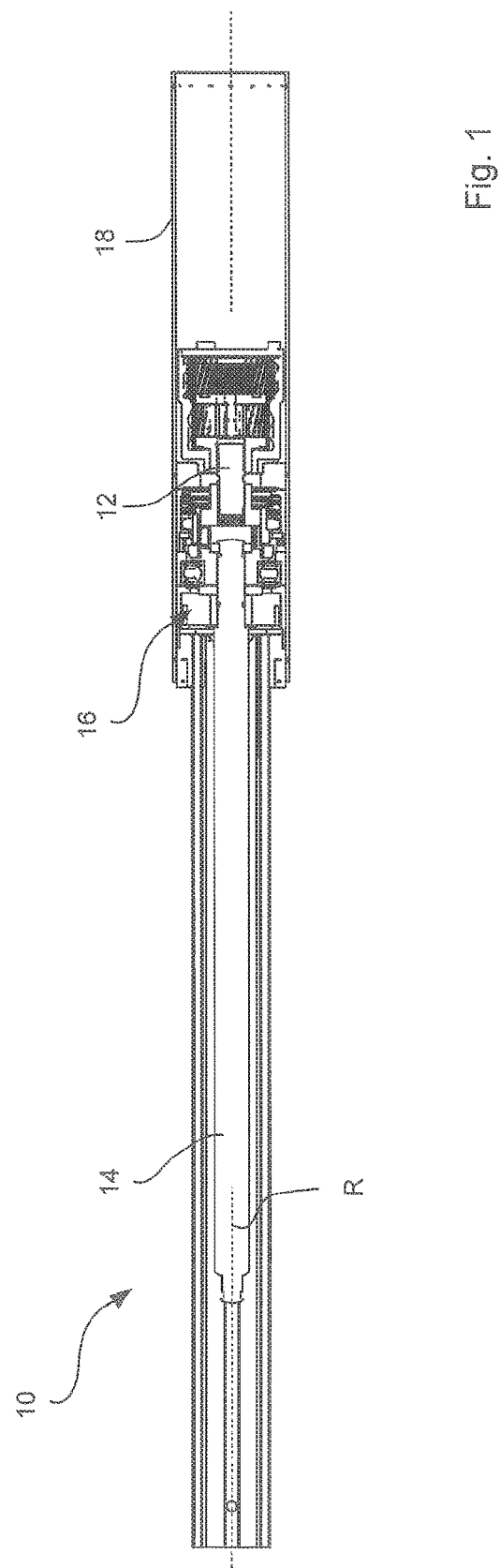
FIG. 1: is an overall view of the drive arrangement according to a first embodiment of the present invention as a section along the axis of rotation.

A drive arrangement according to a first embodiment of the present invention is generally marked as 10 in FIGS. 1 to 8 and comprises a motor drive shaft 12, which provides the driving force of a motor that is not shown in the drawings, a working shaft 14, which delivers operating torque to a working element (likewise not shown) connected thereto or takes operating torque from this working element, and a coupling 16 arranged between the motor drive shaft 12 and the working shaft 14 in order to transmit operating torque from the motor drive shaft 12 to the working shaft 14 or from the working shaft 14 to the motor drive shaft 12. The motor drive shaft 12 and the working shaft 14 are preferably arranged coaxially to one another. Said components of the drive arrangement are accommodated in a housing 18 and in particular are rotatably mounted in the housing 18 about an axis of rotation R. Accordingly, the housing can in particular have a cylindrical form with the axis of rotation R as the axis of the cylinder.

Figure 2:
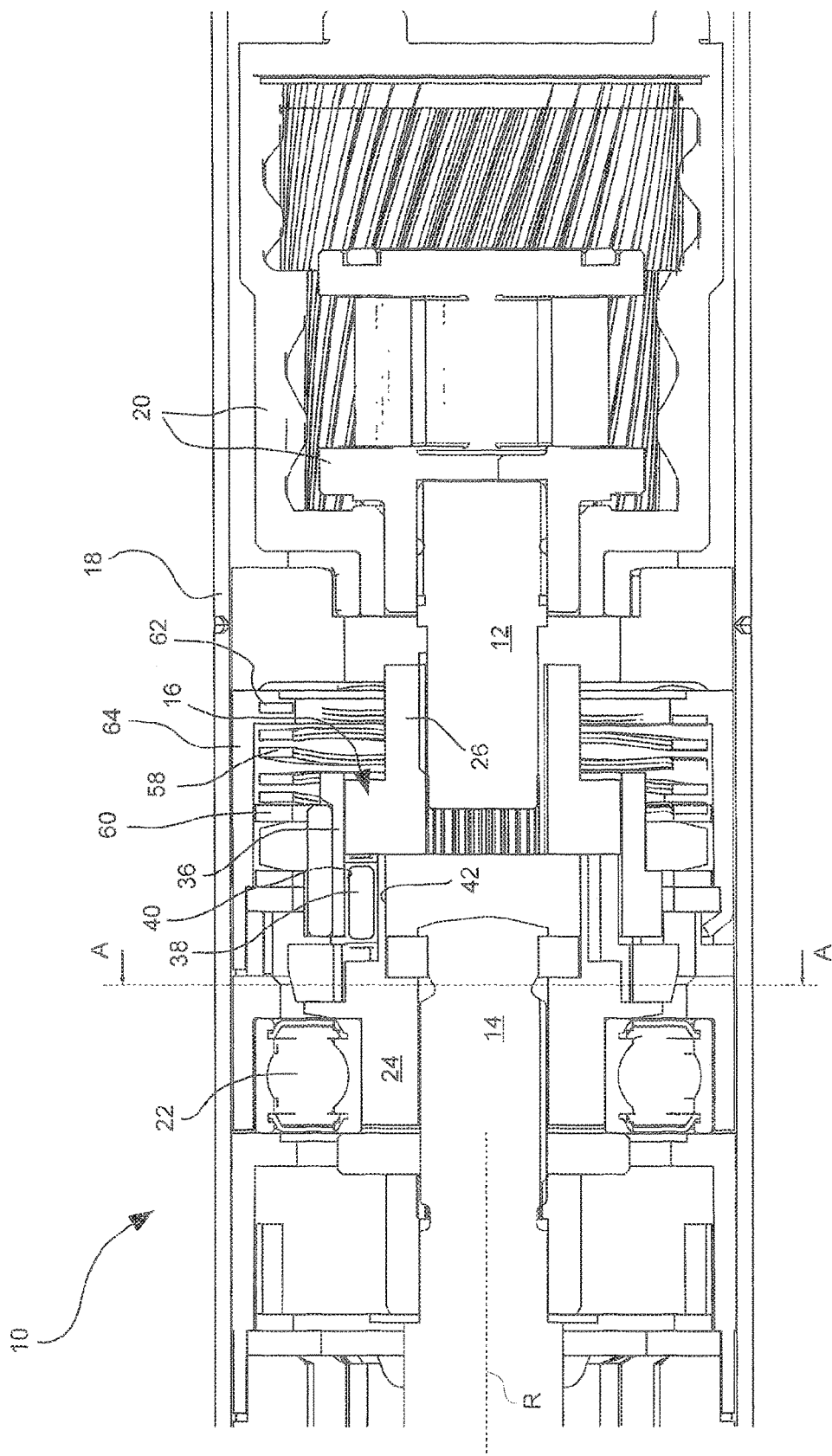
FIG. 2: is an enlarged view of a detail from FIG. 1 in the region of a coupling of the drive arrangement.

As can be seen in particular in FIG. 2, the motor drive shaft 12 (or motor output shaft) is connected for conjoint rotation with a rotor 20 of a motor, in particular an electric motor, which is not illustrated in any greater detail, in order to introduce operating torque of the motor into the drive arrangement 10. The motor is preferably accommodated in the housing 18 and fixed therein. The working shaft 14 is rotatably mounted on a bearing 22 in the housing 18. Ends of the motor drive shaft 12 and of the working shaft 14 that face one another are connected for conjoint rotation with assigned coupling components of the coupling 16, as will be described in more detail below.

Figure 3:
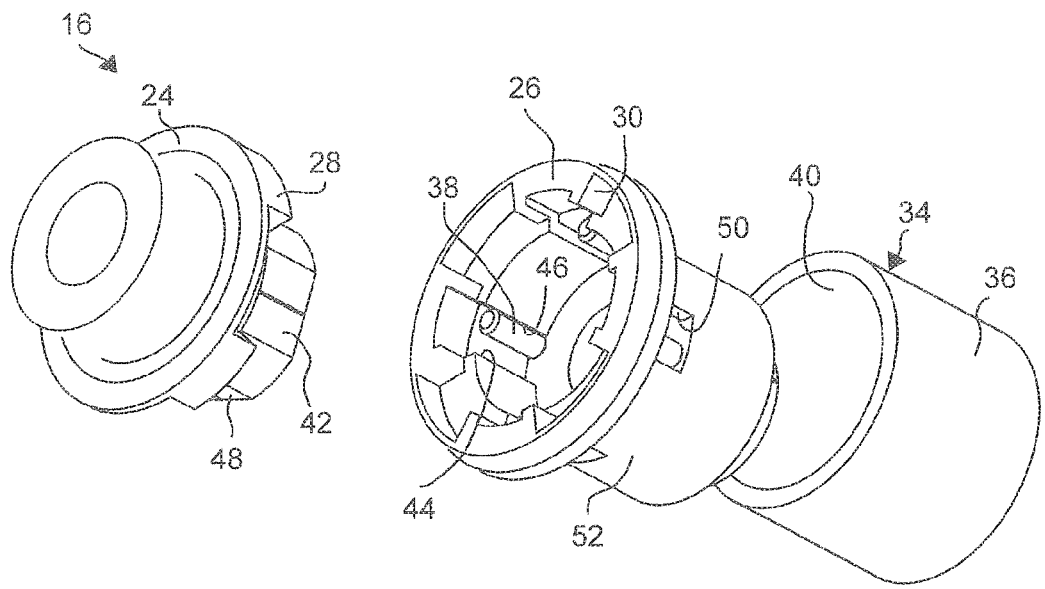
FIG. 3: is a perspective exploded view of the coupling of the drive arrangement.
Figure 4:
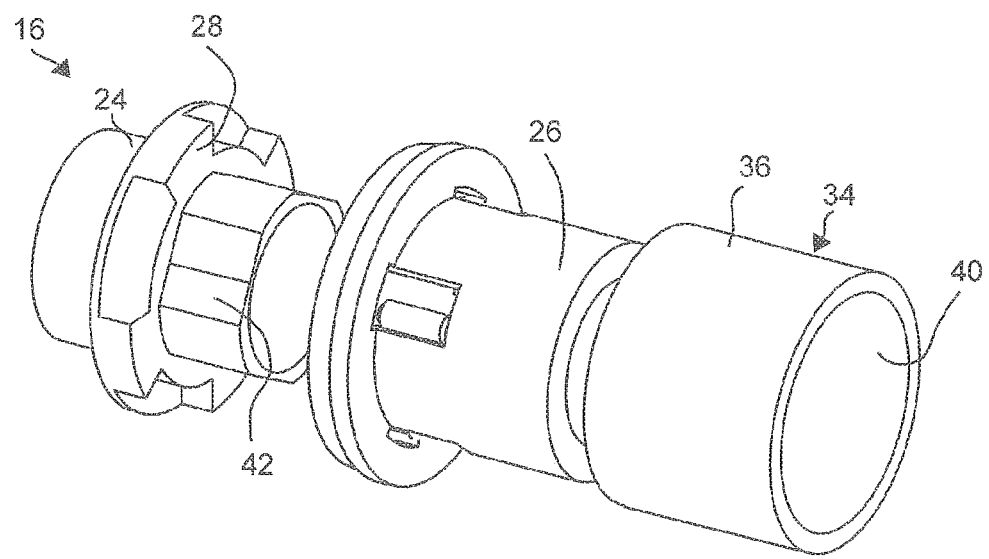
FIG. 4: is another perspective exploded view of the coupling of the drive arrangement.

With reference to FIGS. 2 to 4, the construction of the coupling 16 is described in more detail. The coupling 16 comprises a first coupling component 24 connected for conjoint rotation with the working shaft 14 and a second coupling component 26 connected for conjoint rotation with the motor drive shaft 12. The coupling components 24, 26 can be brought into mutual engagement in an interlocking manner in order to transmit operating torque onto one another. The interlocking can be achieved by at least one protrusion 28, which protrudes from one of the two coupling components 24, 26 and engages in an assigned recess 30 of the other of the two coupling components 24, 26. When the coupling components 24, 26 are rotated relative to one another, the protrusion 28 and the recess 30 can then carry one another along in the circumferential direction. In the illustrated embodiment, a plurality of protrusions 28 (for example four protrusions) are provided, distributed in the circumferential direction, and engage in a corresponding number of recesses 30 such that the coupling components 24, 26 engage with one another in the manner of a tooth system.

In FIGS. 5a, 6a, 7a and 8a, the protrusions 28 and the recesses 30 are shown in section. It can be seen in FIG. 6a, that a protrusion 28 of the first coupling component 24 extends along a circumferential length L1, which is preferably smaller than a circumferential length L2 of an assigned recess 30, such that between the protrusion 28 and the recess 30 a gap 32 remains in the circumferential direction. The gap 32 corresponds to an idling angle W, within which the two coupling components 24, 26 can rotate freely relative to one another.

The drive arrangement 10 further comprises a brake arrangement 34, which is preferably arranged in the region of the coupling 16. In the illustrated embodiment, the brake arrangement 34 comprises a brake cylinder 36 and at least one brake block 38, which is accommodated between an inner cylindrical brake surface 40 of the brake cylinder 36 and a control surface 42 of the first coupling component 24. The brake block 38 is constructed as a rolling element, in particular as a cylindrical roller, and rolls in a recess or flattening that forms the control surface 42 on the outer circumference of the first coupling component 24 and on the inner brake surface 40 of the brake cylinder 36 respectively. A pair of brake block stop surfaces 44, 46 limit the movement of the brake block 38 in the circumferential direction in both directions.

The brake arrangement 34 can be integrated into the coupling 16 in a particularly space-saving manner without significant enlargement of the installation space of said coupling. For this purpose, as achieved in the illustrated embodiment, the control surface 42 can be provided on a cylindrical protrusion 48 of the first coupling component 24, which is inserted into the second coupling component 26 in the axial direction of the axis of rotation R. In a circumferential portion of the second coupling component 26 assigned to the control surface 42, a through opening 50 is formed, in which the brake block 38 is arranged and the inner edges of which form the stops 44, 46 for the brake block 38. A wall thickness of a cylindrical wall 52 of the second coupling component 26 in the region that accommodates the cylindrical protrusion 48 of the first coupling component 24 is smaller than a diameter of the brake block 38 such that the brake block 38 resting on the control surface 42 of the first coupling component 24 passes through the through opening 50 and extends as far as to an outer surface of the cylindrical wall 52 or beyond. Therefore, the brake block 38 can come into contact with the inner brake surface 40 of the brake cylinder 36, which is pushed over the wall 52 of the second coupling component so as to fit.

As can be seen in particular in FIGS. 5b, 6d, 7b and 8b, the control surface 42 is preferably of a form such that it has a greater radial distance from the axis of rotation R at least one first end 54 in the circumferential direction (i.e. in the rolling direction of the brake block 38) than in a central portion 56. In the central portion 56, the radial distance between the control surface 42 and the inner brake surface 40 of the brake cylinder 36 is equal to or greater than the diameter of the brake block 38, such that the brake block 38 is accommodated in a movable manner or even with play between the control surface 42 and the brake surface 40 of the brake cylinder 36. In the region of the first end 54 of the control surface 42, i.e. away from the central portion 56, the radial distance between the control surface 42 and the brake cylinder 36 is smaller than the diameter of the brake body 38. As a result, the brake block 38 is clamped in the gap between the control surface 42 and the brake cylinder 36 when it moves from the central portion 56 towards the end 54 of the control surface 42 such that a relative movement between the first coupling component 24 and the brake cylinder 36 is blocked and the brake arrangement 34 is in the braked state. If, on the other hand, the brake block 38 is arranged in the central portion 56 of the control surface 42, then the first coupling component 24 and the brake cylinder 36 can be rotated relative to one another.

The brake cylinder 36 can generally be rigidly connected directly to the housing 18 or even formed by the inner wall of the housing 18. Preferably however, the brake cylinder 36 is coupled to the housing 18 by a resilient device such that a sudden blocking of the rotation of the working shaft 14 and therefore possible damage to the drive arrangement 10 or components connected thereto does not occur when the brake is applied. In the embodiment, the resilient device is achieved by a wrap spring which acts as a torsion spring and is connected at one end 60 to the brake cylinder 36 and at the other end 62 is fixed to the housing, in particular is connected to a retaining element 64 attached to the housing 18.

The functionality of the drive arrangement 10 of the first embodiment of the invention is described in more detail below with reference to FIGS. 5a to 8b.

Figure 5A:
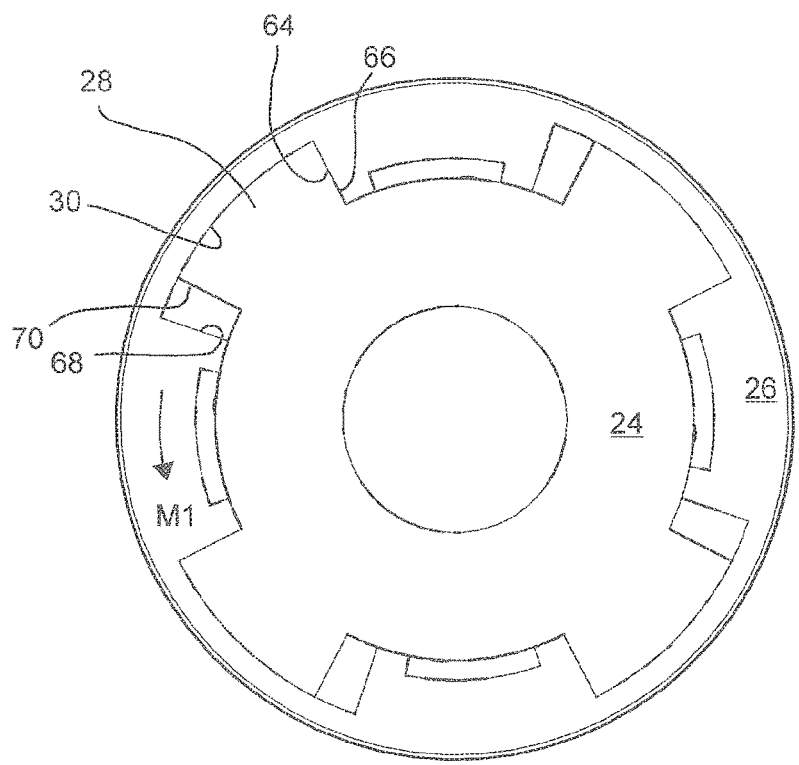
FIG. 5a: is a sectional view of the coupling according to a section line A-A in FIG. 2 while the motor is driving in a first direction of rotation.
Figure 5B:
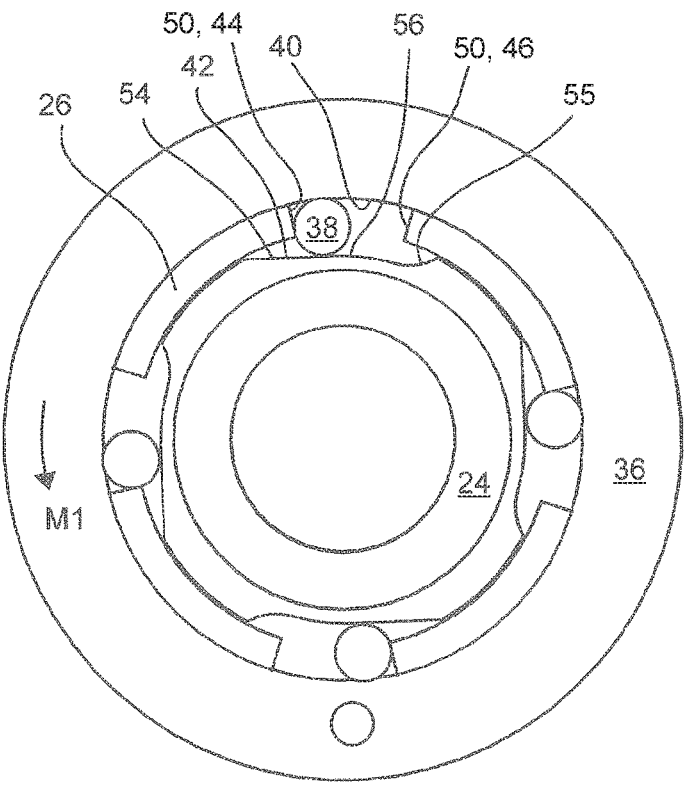
FIG. 5b: is a sectional view according to a section line B-B in FIG. 2 while the motor is driving in the first direction of rotation.

In a first motor operation shown in FIGS. 5a and 5b, the motor, which is not shown, drives the motor drive shaft 12 and thus the second coupling component 26 in a first direction of rotation indicated by an arrow M1 (anticlockwise in the drawings). As a result, a first stop 64 of the recess 30 of the second coupling component 26 hits against a first stop 66 of the protrusion 28 of the first coupling component (if applicable, having traversed part of the idling angle W) in the circumferential direction and then when it rotates, carries the second coupling component 24 along in the direction M1 (FIG. 5a). As can be seen in FIG. 5b, in this rotational position of the two coupling components 24, 26, the brake block 38 is retained by the stop 44 on the inner edge of the opening 50 in the region of the central portion 56 of the control surface 42, such that it is released from the clamping engagement with the brake cylinder 36. The rotation of the motor is thus converted into rotation of the second coupling component 24 and thus the working shaft 14 in the direction of rotation M1.

Figure 6A:
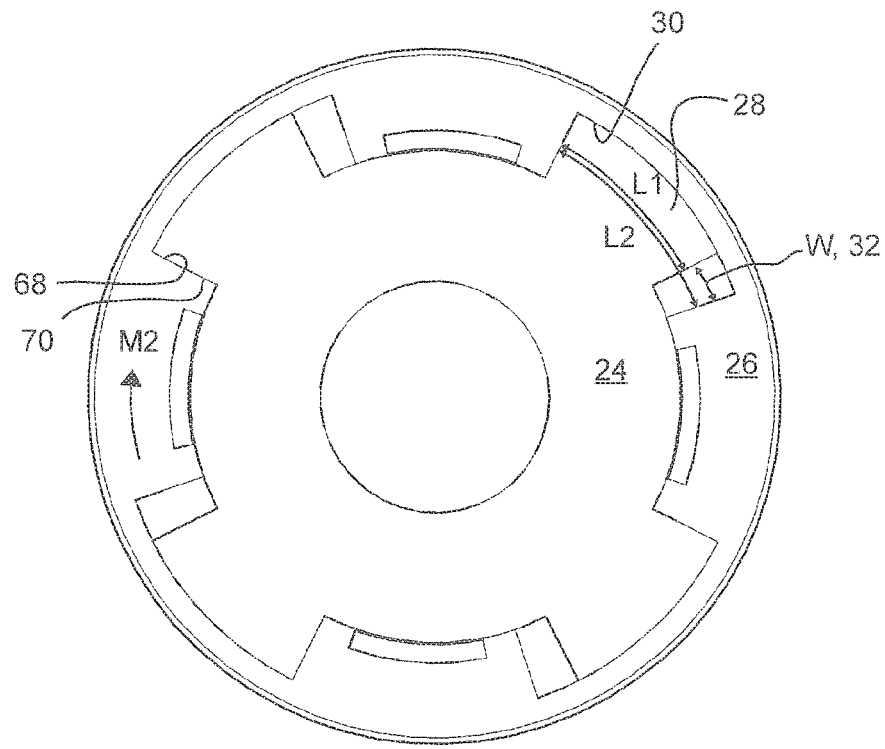
FIGS. 6a and 6b: are views according to FIG. 5a and FIG. 5b, but for a motor drive in a second direction of rotation.
Figure 6B:
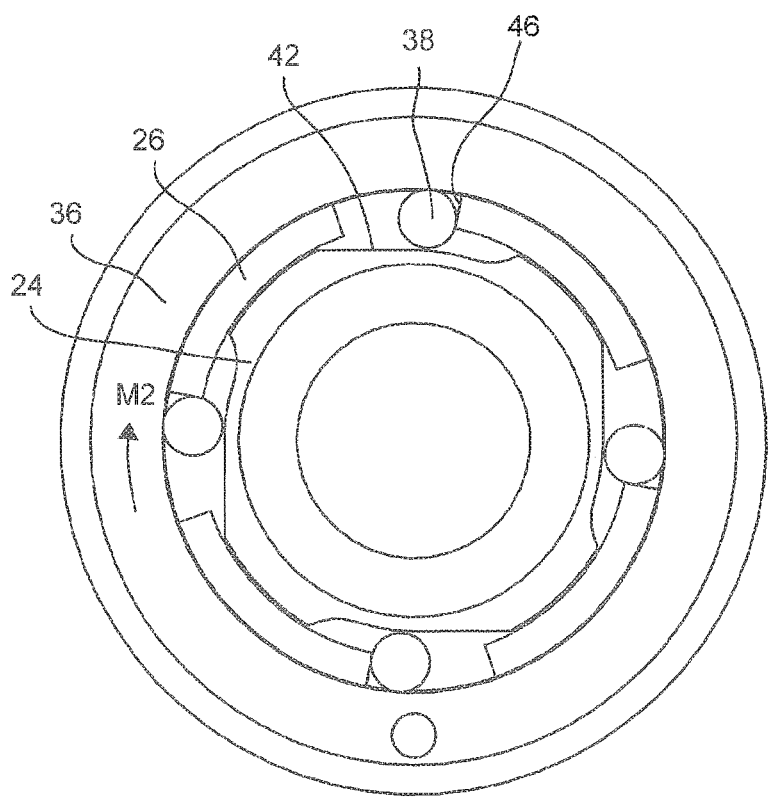

If the rotational movement of the motor is reversed, such that the second coupling component 26, as shown in FIG. 6a, rotates in a second direction of rotation M2 (clockwise in the drawings) opposite to the first direction of rotation M1 then a second stop 68 of the recess 30 located opposite the first stop 64 of the recess 30 hits against a second stop 70 of the protrusion 28 located opposite the first stop 66 of the protrusion 28 (if applicable, having traversed at least part of the idling angle W) such that the second coupling component 26 carries the first coupling component 24 along in the second direction of rotation M2. As can be seen in FIG. 6b, in this rotational position, the second stop 46 rests against the inner edge of the opening 50 of the second coupling component 26 on the brake block 38 and retains the brake block in the central portion 56 of the control surface 42 such that the brake block 38 is not engaged in a clamped manner with the brake cylinder 36 even during rotation in the second direction of rotation and does not impede the common rotation of the coupling components 24, 26 relative to the brake cylinder 36. As a result, the operating torque of the motor drive shaft 12 is not transmitted onto the working shaft 14 in the second direction of rotation M2.

Figure 7A:
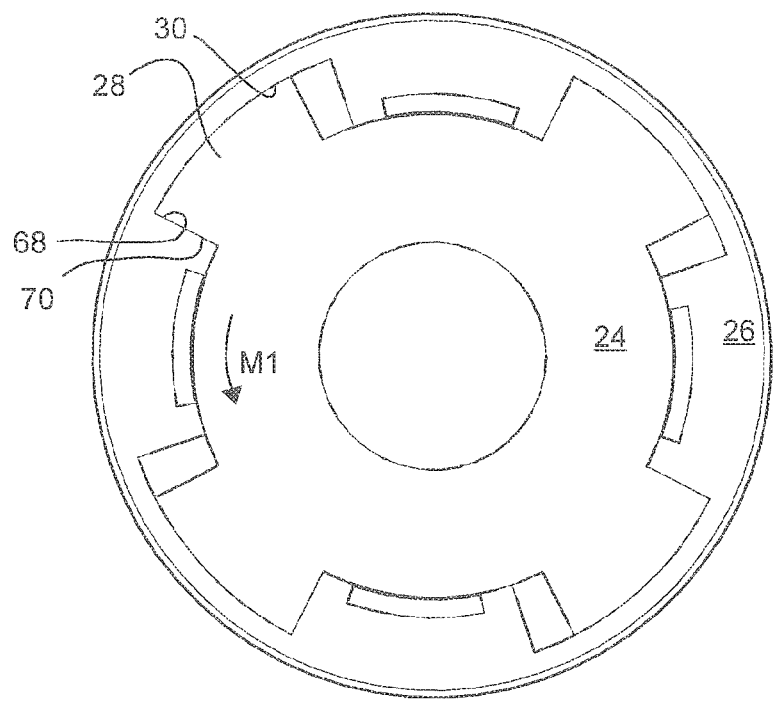
FIGS. 7a and 7b: are views according to FIG. 5a and FIG. 5b, but for a drive on the flap in the first direction of rotation.
Figure 7B:
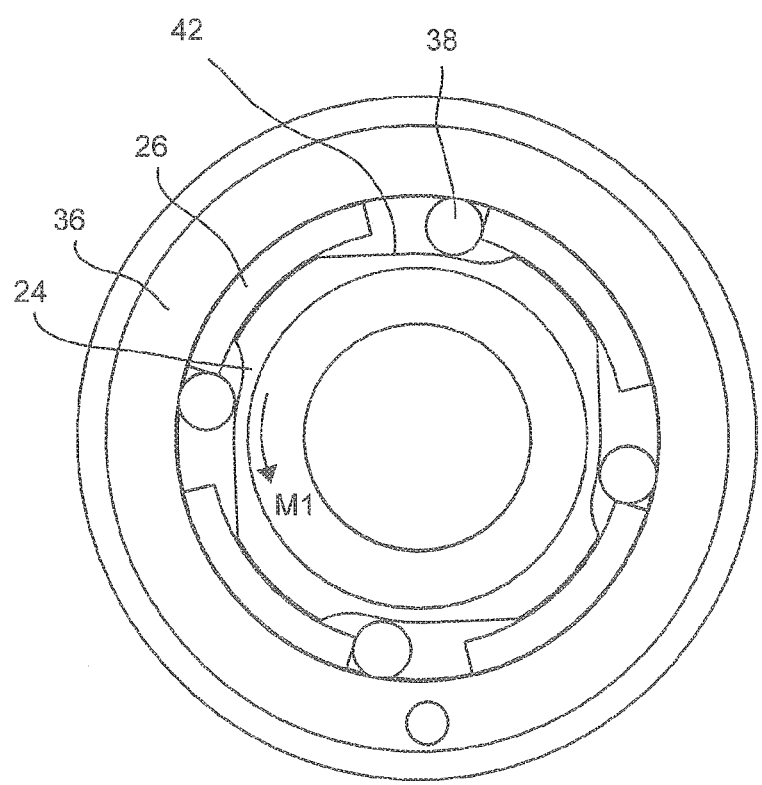

FIGS. 7a and 7b show the case in which operating torque is introduced into the working shaft 14 in the first direction of rotation M1 and accordingly the first coupling component 24 is rotated in the first direction of rotation M1. The second stop 70 of the protrusion 28 of the first coupling component 24 then comes to rest against the second stop 68 of the recess 30 and thus carries the second coupling component 26 along in the first direction of rotation M1. As shown in FIG. 7b, the control surface 42 of the first coupling component 24 has such a contour that the brake block 38 also continues to be released from engagement with the brake cylinder 36 even if it is slightly distanced away from the central portion 56 and has moved towards a second end 55 of the control surface 42 opposite the first end 54. It can be seen by comparing FIGS. 6b and 7b that in the first embodiment, the control surface 42 is formed such that when the second stop 68 of the second coupling component 26 hits against the second stop 70 of the first coupling component 24, the brake block 38 can move freely between the opposite edges 44, 46 of the through opening 50 without generating the brake effect with the brake cylinder 36. When operating torque is introduced into the working shaft 14 in the first direction of rotation M1, the rotational movement is thus substantially transmitted to the motor drive shaft 12 without the effect of a braking force.

Figure 8A:
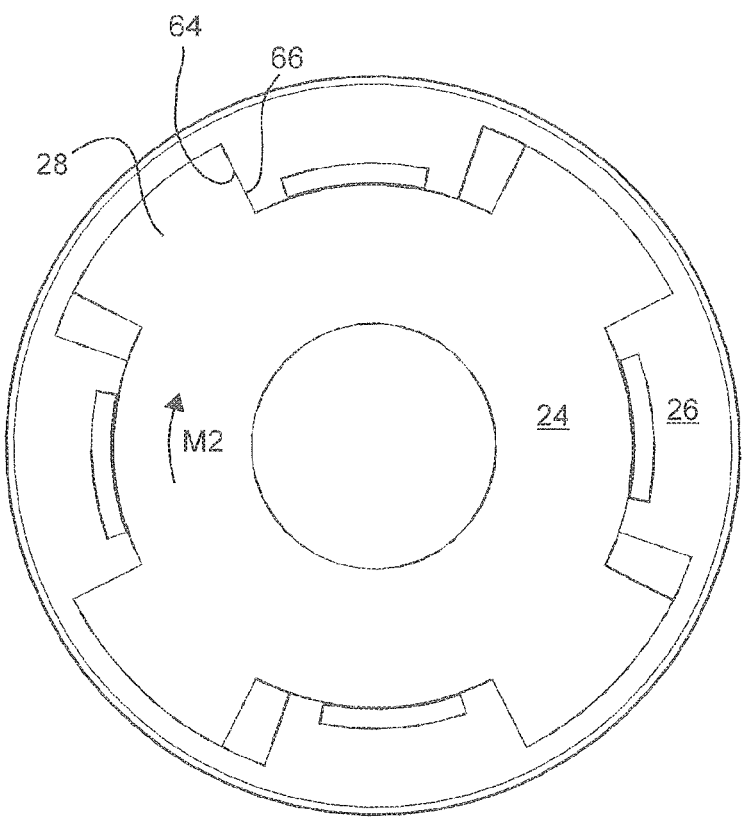
FIGS. 8a and 8b: are views according to FIG. 5a and FIG. 5b, but for a drive on the flap in the second direction of rotation.
Figure 8B:
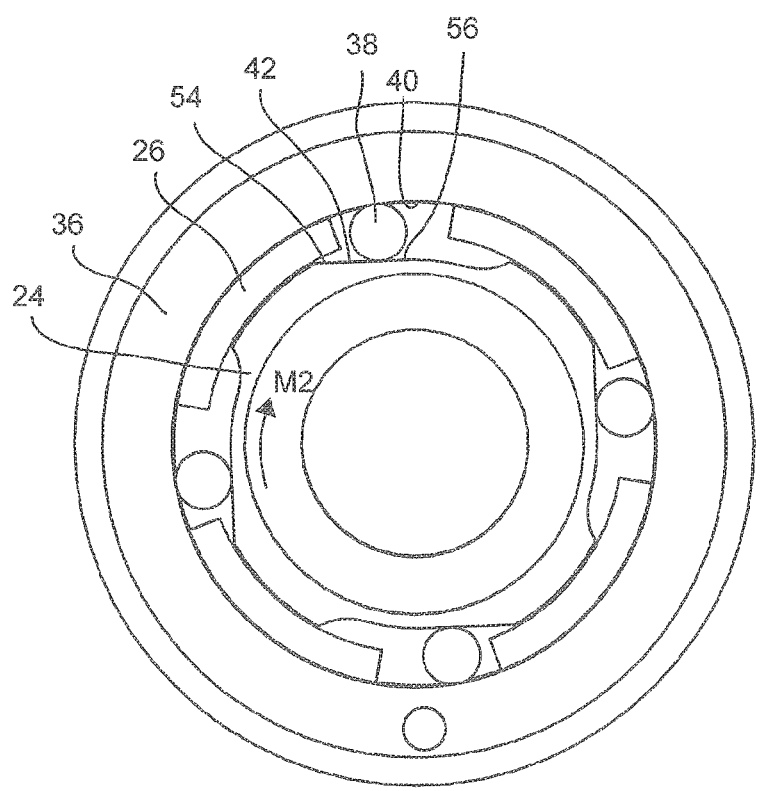

If operating torque acts on the working shaft 14 in the second direction of rotation M2 (FIGS. 8a and 8b), then the first stop 66 of the protrusion 28 in turn comes to rest against the first stop 64 of the recess 30 such that operating torque is transmitted from the first coupling component 24 onto the second coupling component 26 in the second direction of rotation M2. As shown in FIG. 8b, however, when the first coupling component 24 rotates in the second direction of rotation M2, the brake block 38 rolls on the control surface 42 starting from the central portion 56 towards the end 54 of the control surface 42. Since at the end 54 of the second control surface 42, the radial gap between the control surface 42 and the brake surface 40 of the brake cylinder 36 becomes smaller, the second control surface 42 presses the brake block 38 increasingly towards the brake cylinder 36 in the process until the brake block 38 is ultimately clamped between the brake cylinder 36 and the control surface 42. The operating torque of the first coupling component 24 is thus introduced into the brake cylinder 36 which is connected to the housing 18 rigidly or via the spring arrangement 58. The rotation of the first coupling component 24 is thus braked or completely blocked and thus is only converted into a rotational movement of the motor drive shaft 12 in a braked manner or not at all.

The drive arrangement described above according to the first embodiment of the invention can advantageously be used as part of a flap control system, in which a flap, for example a door of a motor vehicle, a building door or similar is mounted on the working shaft 14 such that the flap can be opened and closed electromagnetically by a motor coupled to the motor drive shaft 12. For example, the direction of rotation M1 can then be a direction for opening the flap and the direction of rotation M2, which is opposite to the first direction of rotation M1, can be a direction for closing the flap. According to the operation of the motor in FIG. 5a, 5b, 6a, 6b described above, the motor can then be operated for opening and closing the flap while, during exertion of a force onto the flap by a user or due to gravity or due to other external influences, operating torque can be introduced into the working shaft 14 in the opening direction (FIGS. 7a and 7b) or in the closing direction (FIGS. 8a and 8b). In the illustrated first embodiment, an opening movement of the flap is then allowed, for example as a result of manual activation by a user, while a closing movement of the flap is braked or blocked. Such a flap control system is, for example, advantageous in the case of a flap that is pivotable in the vertical direction (for example the tailgate of a vehicle), where the closing movement of the flap due to gravity should be prevented when the motor is not being driven, i.e. the flap is to be retained or held in the adjusted position that has been reached.

Figure 9:
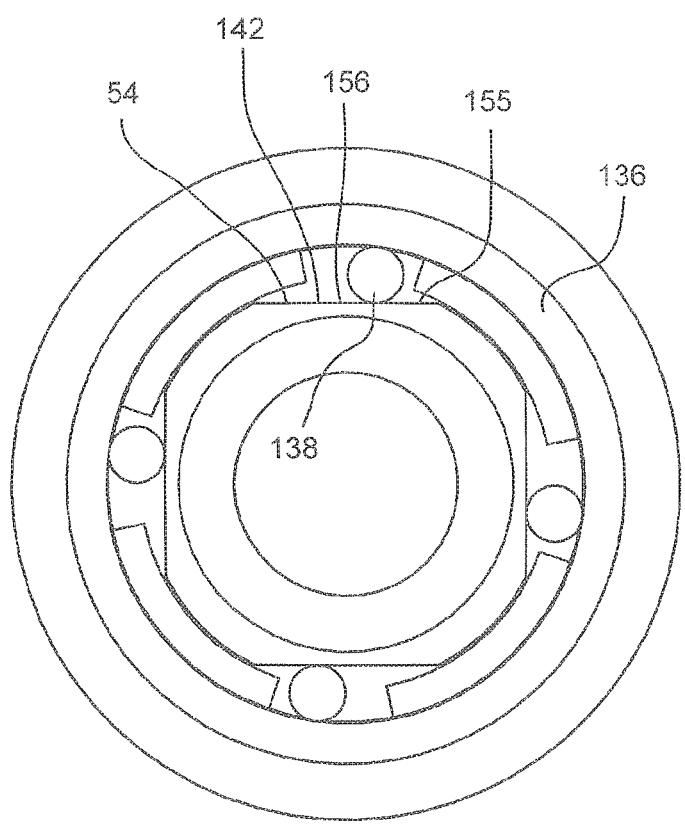
FIG. 9: is a view like FIG. 5B, but for a drive unit according to a second embodiment of the present invention.

In FIG. 9, a second embodiment of the present invention is shown. Only the differences to the first embodiment are described hereinafter and, apart from this, reference is made fully to the above description and the drawings of the first embodiment.

The second embodiment differs from the first embodiment by the shape of the control surface 142. A central portion 156 of the control surface 142 has a distance away from the inside of the brake cylinder 136 that is equal to or greater than the diameter of a brake block 138 arranged therebetween, such that the brake block 138 can move in a rolling manner or freely or with play in the central section 156. The distance of the control surface 142 from the brake cylinder 136 reduces with increasing distance from the central portion 156, and, in the case of the second embodiment, in both directions towards a first end 154 and towards a second end 155. When it moves either in the direction of the first direction of rotation M1 or in the direction of the second direction of rotation M2 away from the central portion 156, the brake block 138 is thus caught in between the control surface 142 and the brake cylinder 136 and blocks a rotational movement between the coupling components and the brake cylinder 138 and thus rotation of the motor drive shaft and the working shaft relative to the housing.

In this way, the drive arrangement of the second embodiment allows a transmission of operating torque from the motor drive shaft to the working shaft in both directions of rotation M1 and M2 and brakes or blocks a rotational movement, which is attributable to the introduction of a rotational movement from the working shaft 14, in both directions of rotation M1 and M2. When using such a drive arrangement in a flap control system of the kind described above, the flap would then be secured in both directions in any position adjusted by the motor, i.e. cannot then be pivoted further either by gravity or by manual use.

The invention claimed is:

1. Drive arrangement comprising:
a motor drive shaft, which provides driving force of a motor,
a working shaft, via which the drive arrangement delivers and receives operating torque,
a coupling, which is set up to transmit operating torque from the motor drive shaft to the working shaft and from the working shaft to the motor drive shaft, and
a brake arrangement, which counters a rotational movement of the working shaft with a brake force,
wherein the brake arrangement counters the rotational movement with a first brake force when operating torque is transmitted from the working shaft to the motor drive shaft, and the brake arrangement counters the rotational movement with a second brake force, which is smaller than the first brake force, or with substantially no brake force at all, when operating torque is transmitted from the motor drive shaft to the working shaft
wherein the coupling has a first coupling component which is arranged or formed on one of the elements out of the working shaft and the motor drive shaft and that the coupling has a second coupling component, which is arranged or formed on the other element out of the working shaft and the motor drive shaft, the two coupling components being coupled or being configured to be coupled to one another to transmit operating torque,
wherein the brake arrangement comprises a brake cylinder and at least one brake block, which is accommodated between an inner cylindrical brake surface of the brake cylinder and a control surface of the first coupling component,
wherein in a housing of the drive arrangement, the motor drive shaft, the working shaft and the coupling are accommodated, and wherein the brake cylinder is coupled to the housing by a resilient device, wherein the resilient device is achieved by a wrap spring which acts as a torsion spring and is connected at one end to the brake cylinder and at the other end is fixed to the housing.

2. Drive arrangement according to claim 1, wherein the coupling for transmitting operating torque is set up for both directions of rotation.

3. Drive arrangement according to claim 2, wherein the brake arrangement counters the rotational movement with a first brake force when operating torque is transmitted from the working shaft to the motor drive shaft in a second direction of rotation and the brake arrangement counters the rotational movement with a third brake force, which is smaller than the first brake force, or counters it with substantially no brake force, when operating torque is transmitted from the working shaft to the motor drive shaft in a first direction of rotation that is opposite to the second direction of rotation.

4. Drive arrangement according to claim 1, wherein the first coupling component has a first stop, which hits against a second stop of the second coupling component in the circumferential direction in relation to the axis of rotation in order to carry the second stop along in rotation in a first direction of rotation and to transmit operating torque onto the second coupling component in the first direction of rotation.

5. Drive arrangement according to claim 4, wherein the first coupling component has a third stop, which hits against a fourth stop of the second coupling component in the circumferential direction in relation to the axis of rotation in order to carry the fourth stop along in rotation in a second direction of rotation opposite to the first direction of rotation and to transmit operating torque onto the second coupling component in the second direction of rotation, when the third stop hits against the fourth stop, the first stop being then arranged at a distance from the second stop such that there is a predetermined idling angle between the coupling components.

6. Drive arrangement according to claim 1, wherein the brake arrangement comprises the brake block which is moved together with the working shaft or the motor drive shaft and is pressed against a brake surface fixed relative to the working shaft and to the motor drive shaft in the event of braking.

7. Drive arrangement according to claim 6, wherein the brake block is a rolling element and/or that the brake surface surrounds the axis of rotation in an annular manner.

8. Drive arrangement according to claim 1, wherein the brake arrangement comprises the brake block which is moved together with the working shaft or the motor drive shaft and is pressed against a brake surface fixed relative to the working shaft and to the motor drive shaft in the event of braking, and further wherein the brake block rolls or slides on the control surface of the first coupling component along a direction of extension of the control surface, the direction of extension of the control surface being orientated orthogonally to the axis of rotation and at an angle to the radial direction, preferably at least in portions orthogonally to the radial direction, and/or the control surface being formed by a local recess or flattening on a cylindrical outer circumference of the first coupling component.

9. Drive arrangement according to claim 1, wherein the brake arrangement comprises the brake block which is moved together with the working shaft or the motor drive shaft and is pressed against a brake surface fixed relative to the working shaft and to the motor drive shaft in the event of braking, and further wherein when operating torque is transmitted from the working shaft to the motor drive shaft in a predetermined direction of rotation, the brake block is pressed against the brake surface by the first coupling component and when operating torque is transmitted from the motor drive shaft to the working shaft in the predetermined direction of rotation, the brake block is moved by the second coupling component in a direction to release the engagement with the brake surface.

10. Drive arrangement according to claim 9, wherein when operating torque is transmitted from the working shaft to the motor drive shaft in a direction of rotation opposite to the predetermined direction of rotation, the brake block is pressed against the brake surface by the first coupling component and when operating torque is transmitted from the motor drive shaft to the working shaft in the direction of rotation opposite to the predetermined direction of rotation, the brake block is moved by the second coupling component in a direction to release the engagement with the brake surface.

11. Flap control system comprising
a flap that is pivotably mounted about a pivot axis,
a motor, and
a drive arrangement including:
a motor drive shaft, which provides driving force of a motor,
a working shaft, via which the drive arrangement delivers and receives operating torque,
a coupling, which is set up to transmit operating torque from the motor drive shaft to the working shaft and from the working shaft to the motor drive shaft, and
a brake arrangement, which counters a rotational movement of the working shaft with a brake force,
wherein the brake arrangement counters the rotational movement with a first brake force when operating torque is transmitted from the working shaft to the motor drive shaft, and the brake arrangement counters the rotational movement with a second brake force, which is smaller than the first brake force, or with substantially no brake force at all, when operating torque is transmitted from the motor drive shaft to the working shaft,
wherein the coupling has a first coupling component which is arranged or formed on one of the elements out of the working shaft and the motor drive shaft and that the coupling has a second coupling component, which is arranged or formed on the other element out of the working shaft and the motor drive shaft, the two coupling components being coupled or being configured to be coupled to one another to transmit operating torque,
wherein the brake arrangement comprises a brake cylinder and at least one brake block, which is accommodated between an inner cylindrical brake surface of the brake cylinder and a control surface of the first coupling component,
wherein in a housing of the drive arrangement, the motor drive shaft, the working shaft and the coupling are accommodated, and wherein the brake cylinder is coupled to the housing by a resilient device, wherein the resilient device is achieved by a wrap spring which acts as a torsion spring and is connected at one end to the brake cylinder and at the other end is fixed to the housing, and
wherein the motor shaft provides the drive force of the motor and wherein the working shaft activates the flap in a first pivot direction and a second pivot direction.

12. Flap control system according to claim 11, wherein the pivot axis extends coaxially to the working shaft or is formed by the working shaft.

13. Flap control system according to claim 11, wherein the flap is lowered in the first pivot direction and that the brake arrangement counters a movement of the flap in the second pivot direction with the first brake force.

* * * * *